(12) United States Patent
Nevill-Manning et al.

(10) Patent No.: US 7,836,012 B1
(45) Date of Patent: Nov. 16, 2010

(54) SYSTEMS AND METHODS FOR INFORMATION EXTRACTION

(75) Inventors: Craig Nevill-Manning, New York, NY (US); Ian Witten, Hamilton (NZ)

(73) Assignee: Google Inc., Mountain View, CA (US)

( * ) Notice: Subject to any disclaimer, the term of this patent is extended or adjusted under 35 U.S.C. 154(b) by 893 days.

(21) Appl. No.: 11/697,677

(22) Filed: Apr. 6, 2007

Related U.S. Application Data

(63) Continuation of application No. 10/675,756, filed on Sep. 30, 2003, now Pat. No. 7,505,984.

(60) Provisional application No. 60/432,130, filed on Dec. 9, 2002.

(51) Int. Cl.
*G06F 17/00* (2006.01)
*G06F 17/30* (2006.01)

(52) U.S. Cl. ...................... 707/602; 707/776

(58) Field of Classification Search .......... 707/602, 707/709, 776
See application file for complete search history.

(56) References Cited

U.S. PATENT DOCUMENTS

| | | | |
|---|---|---|---|
| 5,982,369 | A | 11/1999 | Sciammarella et al. |
| 6,009,442 | A | 12/1999 | Chen et al. |
| 6,037,939 | A | 3/2000 | Kashiwagi et al. |
| 6,058,417 | A | 5/2000 | Hess et al. |
| 6,237,011 | B1 | 5/2001 | Ferguson et al. |
| 6,271,840 | B1 | 8/2001 | Finseth et al. |
| 6,289,353 | B1 | 9/2001 | Hazlehurst et al. |
| 6,298,174 | B1 | 10/2001 | Lantrip et al. |
| 6,332,135 | B1 | 12/2001 | Conklin et al. |

(Continued)

FOREIGN PATENT DOCUMENTS

EP 0964341 A 12/1999

(Continued)

OTHER PUBLICATIONS

Archive of "mySimon: Compare products and prices from around the Web," www.mysimon.com/index.jhtml, [online] [Archived by http://archive.org on Jun. 3, 2003; Retrieved on Jan. 10, 2007] Retrieved from the InternetURL:http://web.archive.org/web/20030603175323/www.mysimon.com/index.jhtml.

(Continued)

*Primary Examiner*—Diane Mizrahi
(74) *Attorney, Agent, or Firm*—Fenwick & West LLP

(57) ABSTRACT

Methods and systems for information extraction are disclosed. In one such method and system, a sample of related articles is obtained, and an article is selected as a seed article. The distances between sample articles are calculated to determine a set of one or more closest articles to the seed article. The set of closest articles is used to identify information fields containing variable data within the seed article. There are a variety of techniques by which this may be performed, one of which is by using dynamic programming alignment to compute alignments between articles. The information fields are labeled, and a template is generated using the labeled fields. The template is used to extract data from a source article by comparing the source article with the template and associating the variable data of the source article with the labeled fields.

20 Claims, 3 Drawing Sheets

U.S. PATENT DOCUMENTS

| | | | |
|---|---|---|---|
| 6,369,840 | B1 | 4/2002 | Barnett et al. |
| 6,567,980 | B1 | 5/2003 | Jain et al. |
| 6,606,625 | B1 | 8/2003 | Mulsea et al. |
| 6,615,184 | B1 | 9/2003 | Hicks |
| 6,647,383 | B1 | 11/2003 | August et al. |
| 6,678,681 | B1 | 1/2004 | Brin |
| 6,732,161 | B1 | 5/2004 | Hess et al. |
| 6,785,671 | B1 | 8/2004 | Bailey et al. |
| 6,853,982 | B2 | 2/2005 | Smith et al. |
| 6,920,609 | B1 | 7/2005 | Manber et al. |
| 7,058,598 | B1 | 6/2006 | Chen et al. |
| 7,076,443 | B1 | 7/2006 | Emens et al. |
| 7,080,070 | B1 | 7/2006 | Gavarini |
| 7,092,936 | B1 | 8/2006 | Alonso et al. |
| 7,103,592 | B2 | 9/2006 | Huret |
| 7,124,129 | B2 | 10/2006 | Bowman et al. |
| 7,127,416 | B1 | 10/2006 | Tenorio |
| 7,149,804 | B2 | 12/2006 | Chatani |
| 7,653,641 | B2 * | 1/2010 | Theissen et al. ....... 707/999.101 |
| 2001/0056418 | A1 | 12/2001 | Youn |
| 2002/0032612 | A1 | 3/2002 | Williams et al. |
| 2002/0065722 | A1 | 5/2002 | Hubbard et al. |
| 2002/0099622 | A1 | 7/2002 | Langhammer |
| 2002/0161658 | A1 | 10/2002 | Sussman |
| 2002/0174076 | A1 | 11/2002 | Bertani |
| 2003/0028446 | A1 | 2/2003 | Akers et al. |
| 2003/0050865 | A1 | 3/2003 | Dutta et al. |
| 2003/0105680 | A1 | 6/2003 | Song et al. |
| 2003/0167209 | A1 | 9/2003 | Hsieh |
| 2004/0073625 | A1 | 4/2004 | Chatani |
| 2004/0107142 | A1 | 6/2004 | Tomita et al. |
| 2005/0021997 | A1 | 1/2005 | Beynon et al. |
| 2005/0071255 | A1 | 3/2005 | Wang et al. |
| 2005/0075940 | A1 | 4/2005 | DeAngelis |
| 2005/0183041 | A1 | 8/2005 | Chiu et al. |
| 2005/0251535 | A1 * | 11/2005 | Theissen et al. ............. 707/200 |
| 2006/0190252 | A1 * | 8/2006 | Starkie ...................... 704/240 |

FOREIGN PATENT DOCUMENTS

| | | |
|---|---|---|
| WO | WO 01/13273 A | 2/2001 |
| WO | WO 01/46870 A1 | 6/2001 |

OTHER PUBLICATIONS

Archive of "mySimon: Frequently Asked Questions," www.mysimon.com/corporate/index.jhtml?pgid=help, [online] [Archived by http://archive.org on Jun. 4, 2001; Retrieved on Jan. 10, 2007] Retrieved from the Internet<URL:http://web.archive.org/web/20010604082923/www.mysimon.com/corporate/index.jhtml?pgid=help.

Archive of "mySimon: Make mySimon your homepage," www.mysimon.com/Nikon_Coolpix_5700/4014-650..., [online] [Archived by http://archive.org on Dec. 7, 2003; Retrieved on Sep. 7, 2006] Retrieved from the Internet<URL:http://web.archive.org/web/20031207141726/www.mysimon.com/Nikon_Coolpix_5700/4014-650....

Archive of "mySimon: Merchant Info," www.mysimon.com/corporate/index.jhtml?pgid=help, [online] [Archived by http://archive.org on Jun. 3, 2003; Retrieved on Jan. 10, 2007] Retrieved from the Internet URL:http://web.archive.org/web/20030603173203/www.mysimon.com/corporate/index.jhtml?pgid=help>.

Archive of "mySimon: Shopping Guides," www.mysimon.com/index.anml, [online] [Archived by http://archive.org on May 10, 2000; Retrieved on Jan. 10, 2007] Retrieved from the Internet URL: http://web.archive.org/web/20000510222151/www.mysimon.com/index.anml>.

Archive of "mySimon: What is mySimon," www.mysimon.com/about_mysimon/companymeet..., [online] [Archived by http://archive.org on May 10, 2000; Retrieved on Sep. 12, 2006] Retrieved from the Internet URL: http://web.archive.org/web/20000510054852/www.mysimon.com/about_mysimon/company/meet...>.

BizRate.com web page, as provided by Internet Archive Wayback Machine at http://web.archive.org/web/20030101-20030922re_/http://bizrate.com/, as published between Jan. 1, 2003 and Sep. 22, 2003.

Brin, S. et al., "The Anatomy of a Large-Scale Hypertextual Web Search Engine," 1998, Computer Science Department, Stanford University, Stanford, CA.

Chang, C-H. et al., "IEPAD: Information Extraction Based on Pattern Discovery," 2001, Dept. of Computer Science and Information Engineering, National Central University, Chung-Li, Taiwan.

Crescenzi, V. et al., "Road Runner: Towards Automatic Data Extraction from Large Web Sites," Proceedings of the $27^{th}$ VLDB Conference, 2001, Rome, Italy.

DealTime.com web page, as provided by Internet Archive Wayback Machine at http://web.archive.org/web/20030101-20030922re_/http://dealtime.com/, as published between Jan. 1, 2003 and Sep. 22, 2003.

Delort, J-Y. et al., "Enhanced Web Document Summarization Using Hyperlinks," HT'03, Aug. 26-30, 2003, Nottingham, United Kingdom.

Freitag, D. et al., "Boosted Wrapper Induction," 2000, American Association for Artificial Intelligence.

Hsu, C-N. et al., "Generating Finite-State Transducers for Semi-Structured Data Extraction from the Web," Information Systems, 1998, pp. 521-538, vol. 23, No. 8, Elsevier Science Ltd. Great Britain.

International Search Report and Written Opinion, PCT/US2004/038559, Mar. 16, 2005.

Kushmerick, N., "Adaptive Information Extraction: Core Technologies for Information Agents," 2002, Computer Science Department, University College Dublin.

Kushmerick, N., "Finite-State Approaches to Web Information Extraction," 2002, Computer Science Department, University College Dublin.

Kushmerick, N., "Wrapper Induction: Efficiency and Expressiveness," Artificial Intelligence, 2000, pp. 15-68, 118, Elsevier Science B.V.

Laender, A. et al., "A Brief Survey of Web Data Extraction Tools," 2002, Department of Computer Science, Federal University of Minas Gerais, Belo Horizonte MG Brazil.

Muslea, I. et al., "Hierarchical Wrapper Induction for Semistructured Information Sources," 1999, pp. 1-27, Kluwer Academic Publishers, the Netherlands.

Sherman, C., "Yahoo! Launches New Product Search," Sep. 23, 2003, SearchEngineWatch, [online] [Retrieved on Sep. 1, 2006] Retrieved from the Internet :http://searchenginewatch.com/showPage.html?page=3081551>.

White, M. et al., "Multidocument Summarization via Information Extraction," First International Conference on Human Language Technology Research (HLT), 2001.

Yahoo Shopping web page, as provided by Internet Archive Wayback Machine at http://web.archive.org/web/20030101-20030922re_/http://shopping.yahoo.com/, as published between Jan. 1, 2003 and Sep. 22, 2003.

Newegg.com, Information from Web Archive.org at http://Web.archive.org/web/20020925093014/http://newegg.com/, Sep. 25, 2002.

\* cited by examiner

SYSTEMS AND METHODS FOR INFORMATION EXTRACTION

CROSS-REFERENCE TO RELATED APPLICATIONS

This application claims priority under 35 U.S.C. §120 as a continuation of patent application Ser. No. 10/675,756, filed on Sep. 30, 2003, entitled "Systems and Methods for Information Extraction," which claims the benefit of U.S. provisional application Ser. No. 60/432,130, filed on Dec. 9, 2002, entitled "Methods and Apparatus for Information Extraction," both of which are hereby incorporated by reference in their entirety.

FIELD OF THE INVENTION

The present invention relates generally to information extraction and, more particularly, to extracting data from articles.

BACKGROUND OF THE INVENTION

Many articles, of which documents are one type, are created based on information contained in a database. Such articles have data that remains constant and other variable data obtained from the database. For example, there may be a set of documents each containing a list of items offered for sale. All of these documents contain header data and general sales terms, for example, which would remain constant. The data for each individual item, such as product category, product description, product image, price, and SKU number, is variable and would differ for each individual item. The Internet, for example, contains many web pages similarly constructed—where several web pages have similar or identical constant data and variable data associated with a variety of information fields.

It is desirable to extract this unstructured variable data contained in the documents so that the data can be structured. Providing structure to this variable data allows the data to be more easily searched, presented and processed more efficiently than could the original documents. For example, the Internet contains a great number of web sites offering items for sale. However, a user who wishes to purchase a particular item from the Internet conventionally visits the web sites offering the item for sale to compare the sales terms of the item, such as price. Such an approach can be very time consuming. It is, thus, desirable to extract the relevant data about the item from all or several of the websites offering the item for sale and present it to the user in a single web page or a series of web pages.

In situations such as the Internet, web pages are formatted for viewing by people. Due to the unstructured nature of web pages, the variable data is often embedded with other format and constant data making the identification of variable data difficult. The owner or author of the web pages may not be the entity that desires to extract the data. This results in problems when trying to extract the variable data.

Some methods and systems exist that attempt to identify, extract and manipulate this variable data. Most of these methods and systems utilize a wrapper procedure. A wrapper uses the formatting conventions of a document to identify the variable data. For example, if one wants to extract price information about items for sale from a document and the item names always appear in bold and the prices always appear in italics in the document, a wrapper can be created to recognize this format and extract the data identified as bold as the item names and extract the data identified as italics as the prices.

Some systems and methods use a customized wrapper procedure. Because few document and web page authors publish their formatting conventions, a designer of a customized wrapper must manually construct a wrapper for each type of document. Further, the format of a document may periodically change. As a result, customized wrappers are tedious and error prone.

Other systems and methods attempt to learn wrappers from labeled examples of the data required to be extracted from documents. One such example is described in Kushmerick, N., Wrapper Induction: Efficiency and Expressiveness, Artificial Intelligence J. 118(1-2):15-68 (2000) (special issue on Intelligent Internet Systems), and http://www.cs.ucd.ie/staff/nick/home/research/download/kushmerick-aij2000.pdf. The wrapper induction technique described by Kushmerick involves learning the formatting conventions of a web page from a set of examples of a resource's web pages, each annotated with text fragments to be extracted. The Kushmerick technique typically requires a user to point out examples of the types of fields to extract data from before the wrapper induction is run on a page and the technique has problems properly identifying variable data if the format changes slightly from web page to web page.

SUMMARY OF THE INVENTION

Embodiments of the present invention comprise systems and methods for information extraction. Embodiments improve identifying information fields in articles and extracting data from articles. One aspect of an embodiment of the present invention comprises receiving a plurality of related articles, determining a seed article from the related articles, identifying at least one information field within the seed article by comparing the seed article to at least one other related article, determining a label for the information field, and associating a pointer to a location of the information field in the seed article to create a template. Comparing the seed article to at least one other related article can be performed by a dynamic programming alignment algorithm to determine an alignment between the seed article and the related article or by other means. Another aspect of an embodiment of the present invention comprises identifying a plurality of templates each comprising at least one information field, comparing the source article to the templates to determine the closest template, and associating data from the article with an information field. Additional aspects of the present invention are directed to computer systems and to computer-readable media having features relating to the foregoing aspects.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION

The present invention comprises methods and systems for information extraction, including methods and systems for identifying and extracting information from articles. Reference will now be made in detail to exemplary embodiments of the invention as illustrated in the text and accompanying drawings. Those skilled in the art will recognize that many other implementations are possible, consistent with the present invention. The same reference numbers are used throughout the drawings and the following description to refer to the same or like parts.

Figure 1:
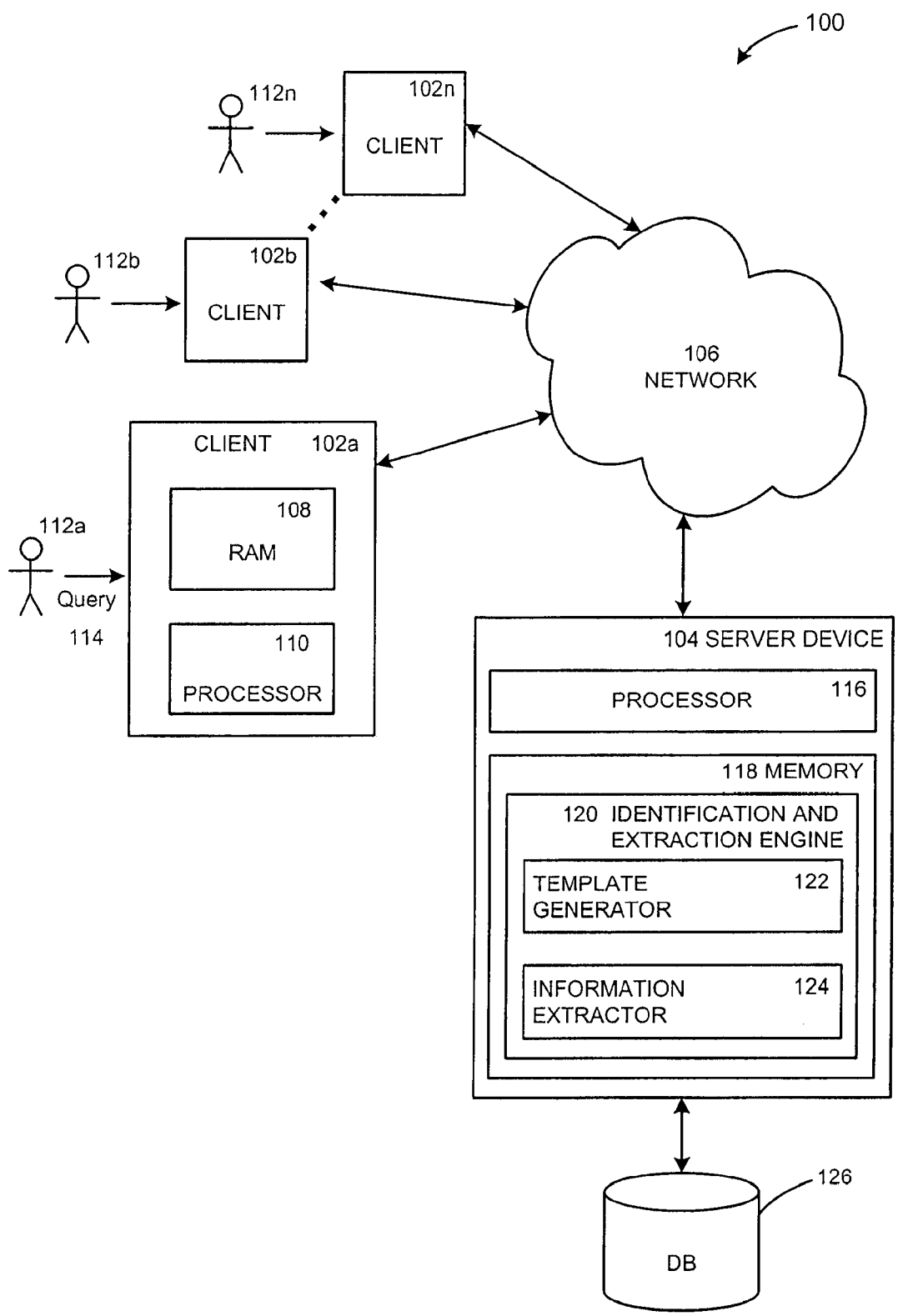
FIG. 1 illustrates a block diagram of a system in accordance with one embodiment of the present invention.

Various systems in accordance with the present invention may be constructed. FIG. 1 is a diagram illustrating an exemplary system in which exemplary embodiments of the present invention may operate. The present invention may operate, and be embodied in, other systems as well.

The system 100 shown in FIG. 1 includes multiple client devices 102a-n, a server device 104, and a network 106. The network 106 shown includes the Internet. In other embodiments, other networks, such as an intranet may be used. Moreover, methods according to the present invention may operate in a single computer. The client devices 102a-n shown each include a computer-readable medium, such as a random access memory (RAM) 108 in the embodiment shown, coupled to a processor 110.

The processor 110 executes a set of computer-executable program instructions stored in memory 108. Such processors may include a microprocessor, an ASIC, and state machines. Such processors include, or may be in communication with, media, for example computer-readable media, which stores instructions that, when executed by the processor, cause the processor to perform the steps described herein.

Embodiments of computer-readable media include, but are not limited to, an electronic, optical, magnetic, or other storage or transmission device capable of providing a processor, such as the processor in communication with a touch-sensitive input device, with computer-readable instructions. Other examples of suitable media include, but are not limited to, a floppy disk, CD-ROM, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. The instructions may comprise code from any computer-programming language, including, for example, C, C++, C#, Visual Basic, Java, and JavaScript.

Client devices 102a-n may also include a number of external or internal devices such as a mouse, a CD-ROM, a keyboard, a display, or other input or output devices. Examples of client devices 102a-n are personal computers, digital assistants, personal digital assistants, mobile phones, smart phones, pagers, digital tablets, laptop computers, a processor-based device and similar types of systems and devices. In general, a client device 102a-n may be any type of processor-based platform connected to a network 106 and that interacts with one or more application programs. The client devices 102a-n shown include personal computers executing a browser application program such as Internet Explorer™, version 6.0 from Microsoft Corporation, Netscape Navigator™, version 7.1 from Netscape Communications Corporation, and Safari™, version 1.0 from Apple Computer.

Through the client devices 102a-n, users 112a-n can communicate over the network 106 with each other and with other systems and devices coupled to the network 106. As shown in FIG. 1, a server device 104 is also coupled to the network 106.

The server device 104 shown includes a server executing an identification and extraction engine application program located in memory 118. Similar to the client devices 102a-n, the server device 104 shown includes a processor 116 coupled to a computer readable memory 118. Server device 104, depicted as a single computer system, may be implemented as a network of computer processors. Examples of a server devices 104 are servers, mainframe computers, networked computers, a processor-based device and similar types of systems and devices. Client processors 110 and the server processor 116 can be any of a number of well known computer processors, such as processors from Intel Corporation of Santa Clara, Calif. and Motorola Corporation of Schaumburg, Ill. The server device 104 may also be connected to a database 126.

The server device 104, or related device, can access the network 106 to locate articles, such as web pages, stored at other devices or systems connected to the network 106. Articles include documents, for example, web pages of various formats, such as HTML, XML, XHTML, Portable Document Format (PDF) files, and word processor, database, and application program document files, audio, video, or any other information of any type whatsoever made available on a network (such as the Internet), a personal computer, or other computing or storage means. The embodiments described herein are described generally in relation to documents, but embodiments may operate on any type of article.

In one embodiment, the identification and extraction engine 120 identifies information fields in a document or set of related documents and extracts data from a source document using the information fields. The identification and extraction engine 120 includes a template generator 122 and an information extractor 124. In the embodiment shown, each comprises computer code residing in the memory 118. The template generator 122 generates a template identifying information fields in the documents, which contain variable data, for a set of related documents. These information fields are provided a label and a template is generated using the labeled identification fields. In one embodiment, the template generator can generate templates offline. The information extractor 124 utilizes the generated template to extract data from a source document or documents by comparing the source document with the template and associating the variable data of the source document with the labeled fields. In one embodiment, information extraction can be performed every time a website is crawled, for example, once a week. Other functions and characteristics of the template generator 122 and the information extractor 124 are further described below.

It should be noted that the present invention may comprise systems having different architecture than that which is shown in FIG. 1. For example, in some systems according to the present invention, the template generator 122 and information extractor 124 may not be part of the identification and extraction engine 120 or may not be located on the same server device. The system 100 shown in FIG. 1 is merely exemplary, and is used to explain the exemplary methods shown in FIGS. 2-3.

Various methods in accordance with the present invention may be carried out. One exemplary method according to the present invention comprises accessing a plurality of related articles, determining a seed article from the related articles and identifying at least one information field within the seed article by comparing the seed article to at least one other related article. The seed article may be compared to at least one other related article, for example, by a dynamic programming alignment algorithm to determine an alignment between the seed article and the related article. The information field may correspond to variable data.

The exemplary methods may also comprise determining a cluster of related articles from the related articles and this may be performed, for example, by using a dynamic programming alignment algorithm to compute edit distances between the seed article and all of the related articles and choosing the cluster of articles based on the edit distances. At least one information field within the seed article may be identifying by comparing the seed article to the cluster of articles.

This method may further comprise determining a label for the information field and associating a pointer to a location of the information field in the seed article to create a template.

In some embodiments, the articles can be web pages and the related articles can be web pages on a web site. In these embodiments, the method may further comprise simplifying the content on a web page and this may include preserving visible text, visible images, and visible paragraph and table formatting.

Another exemplary method according to the present invention comprises identifying a plurality of templates each comprising at least one information field, comparing the source article to the templates to determine the closest template, and associating data from the article with an information field from the closest template. The source article may be compared to the templates by a dynamic programming alignment algorithm to compute an edit distance between the source article and the templates. The source article may be a web page. The method may further comprise extracting the associated data.

Figure 2:
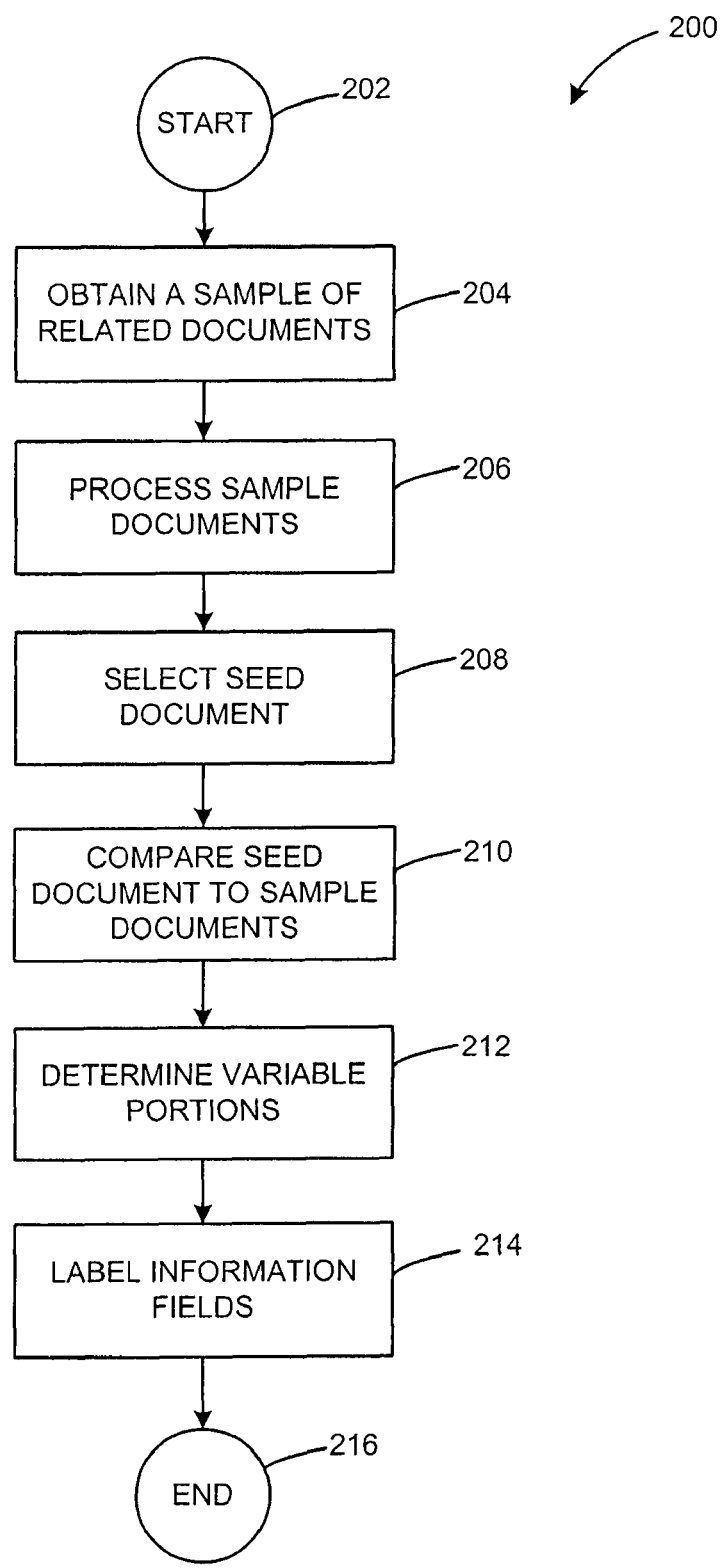
FIG. 2 illustrates a flow diagram of a method in accordance with one embodiment of the present invention.

FIG. 2 illustrates an exemplary method according to an embodiment of the present invention. This exemplary method is provided by way of example, as there are a variety of ways to carry out methods according to the present invention. The method 200 shown in FIG. 2 can be executed or otherwise performed by any of various systems. The method 200 is described below as carried out by the system 100 shown in FIG. 1 by way of example, and various elements of the system 100 are referenced in explaining the example method of FIG. 2.

The method 200 shown provides a method for identifying data fields within related documents. In one embodiment, the related documents are web pages from a web site, in which the web pages are generated based on a database.

Each block shown in FIG. 2 represents one or more steps carried out in the exemplary method 200. Referring to FIG. 2, in block 202, the example method 200 begins. Block 202 is followed by block 204, in which a sample set of related documents is obtained. The documents are related in that they share the same or similar template, in which certain data is constant and certain data is variable from document to document. In one embodiment, the template generator 122 crawls all of the web pages of a web site located on a device connected to the network 106 and indexes and caches the web pages. The index and cache could be stored, for example, in the template generator 122 itself, another location in memory 118 or in an external memory location. The template generator then randomly selects web pages from the cache. In another embodiment, the documents may be selected algorithmically or by inspection. Alternatively, a sample of documents is not selected and all of the relevant documents are processed.

Next in block 206, in the embodiment shown the documents are processed by the template generator 122 to remove extraneous formatting. For example, in the case of web pages encoded in Hyper-text Markup Language (HTML), the HTML may be simplified so as to reduce the page to a subset of HTML related to layout. In this example, the document is reduced to contain only visible text, images, paragraph and table formatting and all contiguous text is placed on a single line. This is accomplished by removing text formatting, white spaces, JavaScript, comments, forms, etc. Alternative or additional document processing may be carried out.

In one embodiment, the documents are then compared to create clusters of a number of closely related documents. For example, each sample document may be compared and then aligned with the closest nine documents to create a cluster of ten documents. In one embodiment, the dynamic programming alignment algorithm is used to compare the documents. The dynamic programming alignment algorithm compares and aligns documents to compute relative scores for the compared documents known as edit distances. The edit distance can be a number, roughly proportional to the number of insertions and deletions necessary to transform one document into another. An alignment of two documents, for example, can be a list of those insertions or deletions, or equivalently, a mapping from parts of one document to parts of another. Dynamic programming alignment is a method understood by those skilled in the art, and accordingly need not be described in further detail herein. Further details on dynamic programming may be found in Dan Gusfield, Algorithms on Strings, Trees, and Sequences, Computer Science and Computation Biology (Cambridge University Press 1997), which is incorporated herein by reference.

Then in block 208, a "seed" document is selected. A seed document is generally the document that indicates where constant data appears and where variable data appears in the sample documents. Preferably, the seed document is the best document in the available sample set of documents to so indicate. In one embodiment, the seed document is automatically chosen by the template generator 122. In the embodiment explained above, the template generator 122 organizes the documents into clusters of closely related documents. The template generator 122 then selects a document from the cluster as the seed document for the cluster. The seed document could be the document with the smallest edit distances to the other documents in the cluster.

For example, for a website that sells CDs, books and toys, all of the website's web pages for CDs will generally be formatted the same, as will the web pages for books and toys. The web pages for CDs will generally differ in format from the web pages for books and toys. The template generator would first crawl the website and select a sample set of web pages. When the template generator aligns the documents to form related clusters of documents, at least three clusters of documents, for example, would be formed—one for CD web pages, one for book web pages and one for toy web pages. The template generator would then select a web page from each of the three clusters to be used as a seed document for that cluster.

In another embodiment, the sample documents are presented by the server device 104 to a user 112a at client 102a, who selects the seed document. In this embodiment, the user 112a would select the seed document based on a determination of the relative suitability of the various documents as a template. In the example above, the template generator may present all of the clusters to the user. The user would then select a seed document for each of the clusters or, for example, only for the CD web pages if the user is interested in only obtaining CD information. The seed document could be selected in a variety of other ways known to those skilled in the art. For example, the seed document may be provided by the author or creator of the documents.

Next, the seed document identified in block 208 is compared to the sample documents in block 210 by the template generator 122 to determine the similarity between the compared documents. In one embodiment, the seed document is compared to its cluster of most closely related documents using a dynamic programming algorithm to align the seed document with the cluster documents. Alternatively, the seed document can be aligned with all of the sample documents.

For example, if the documents are web pages containing information about CDs, each web page could contain constant data such as the terms "ARTIST", "TITLE", "DESCRIPTION", and "PRICE" and each web page would contain the variable data associated with each term. The two web pages are then aligned to form pairs of data so that the same constant terms and variable data in each page match up. In one embodiment, the seed document is aligned with all of the cluster documents at once. In another embodiment, a star alignment algorithm is used to approximate the alignment of the seed document with the cluster documents. The star alignment algorithm is known to those skilled in the art.

Next in block 212, the variable data portions in the documents are determined by the template generator 122 based on the comparisons performed in block 210. For example, in one embodiment, the alignments of the each of the cluster documents with the seed document are analyzed to determine the constant data portions of the seed document and the variable data portions of the seed document. In another embodiment, the alignments of all of the sample documents with the seed document are analyzed. Where the data on the documents differs from the data on the seed document indicates variable data and where the data on the documents is the same as the data on the seed document indicates constant data. In the example given above, after alignment of the web pages, where there are pairs of identical data, such as, PRICE-PRICE, this indicates constant data and where there are pairs of dissimilar data, such as, $12.98-$13.98, this indicates variable data.

It should be understood that "variable" and "constant" need not be determined using absolute criteria. "Variable" is an indication of a relatively high degree of variability, and/or a predetermined (e.g., absolute) degree of variability. "Constant" is an indication of a relatively high degree of constancy, and/or a predetermined (e.g., absolute) degree of constancy. For example, in one embodiment, it could be required that six out of ten documents should differ from the seed document in a particular location before a field is declared variable.

In block 214, the variable portions of the documents identified in block 212 are identified as information fields and labeled. In one embodiment, to facilitate identification of information fields, a list of the variable portions of the seed document are presented to a user 112a by the server device 104, grouped by the part of the seed document to which they align. The identified information fields of relevance are labeled by the user 112a for referencing. In the example given above, the user would receive identified information fields containing artist, title, description and price data for all of the cluster documents and would label them as such through the use of a user interface, for example. In one embodiment, the user may select from a predefined list of field names or enter the field name of their choice. The user may be presented with certain information fields that the user is not interested in and will not label.

Alternatively, the template generator automatically generates labels for relevant information fields. In this embodiment, the template generator could utilize machine learning techniques known to those skilled in the art in conjunction with variable data previously extracted from other documents to label the information fields. Each label for the identified information fields is associated with a pointer to the location of the corresponding variable portion in the seed document to create a template.

The template can then be used to extract variable data from documents as is described, for example, with reference to FIG. 3 below. Multiple templates may be created for each document type or format. For example, a web site may have multiple web page formats, and a template corresponding to each different web page format may be created. Those skilled in the art will also recognize that the functions described with reference to each block in FIG. 2 are illustrative only, and are not intended to be limiting.

Figure 3:
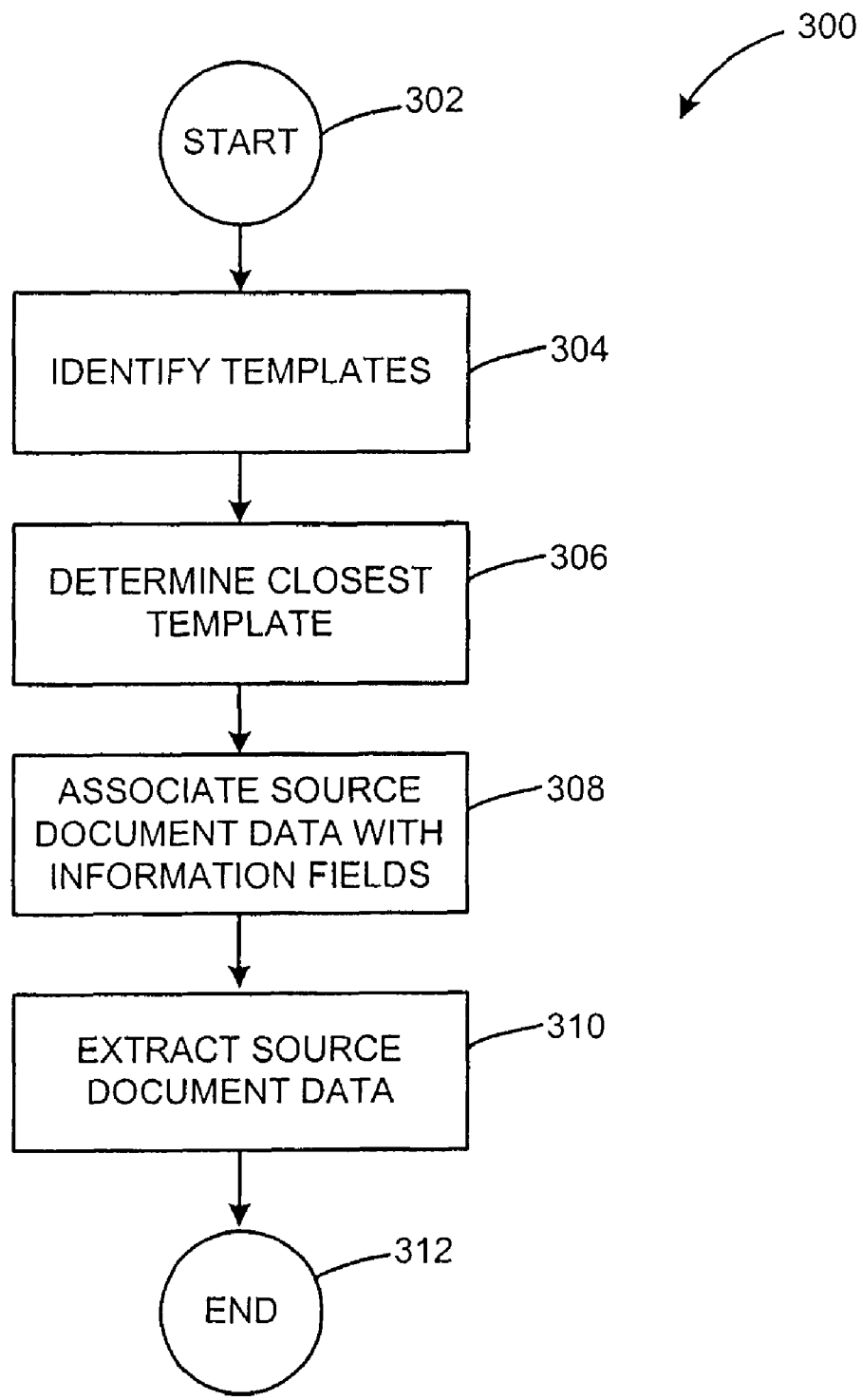
FIG. 3 illustrates a flow diagram of a method in accordance with one embodiment of the present invention.

FIG. 3 illustrates an exemplary method according to an embodiment of the present invention. This exemplary method is provided by way of example, as there are a variety of ways to carry out methods according to the present invention. The method 300 shown in FIG. 3 can be executed or otherwise performed by any of various systems. The method 300 is described below as carried out by the system 100 shown in FIG. 1 by way of example, and various elements of the system 100 are referenced in explaining the example method of FIG. 3.

The method 300 shown provides a method for extracting data from a source document or documents. In one embodiment, the source document is a web page on a web site, in which the web page is generated based on a database.

Each block shown in FIG. 3 represents one or more steps carried out in the exemplary method 300. Referring to FIG. 3, in block 302, the example method 300 begins. Block 302 is followed by block 304, in which one or more templates are identified by the information extractor 124. The templates may, for example, be the templates created previously with respect to FIG. 2 and be all of the templates associated with a particular web site. Next in block 306, the source document is compared with the templates by the information extractor 124 to determine the closest template. In one embodiment, the source document is aligned with each of the identified templates utilizing dynamic programming alignment techniques and the closest template is determined using edit distances computed for each template as aligned with the source document.

If for example, the source document is a web page listing CDs for sale from a website that sells CDs, books and toys, the template generator may have three templates, one for CD web pages, one for book web pages and one for toy web pages. The information extractor 124 would compare the source web page to the three templates utilizing the dynamic programming alignment algorithm to compute pairwise edit distances for the three templates in relation to the source web page. The CD template would likely have the smallest edit distance and be selected.

In block 308, data within the source document is then associated with the information fields labeled in the template by the information extractor 124. For example, once the template and source document are aligned, pointers in the template are used to point to information fields containing variable data in the source document. In the example discussed above, the pointers on the CD template are used to point to the location on the web page that contains the artist, title, description and price variable data. In block 310, the data within the source document corresponding to each information field is extracted by the information extractor and labeled with the corresponding information field label.

The extracted data can then be stored in a database where it can be searched, presented, and processed more efficiently than could the original documents. In the example above, the artist, title, description and price variable data is labeled as such and stored in a database with an indication of the source website. This can be done for multiple website and all of the information can be presented to a user when the user selects to view all available CDs. Alternatively, the user can search the information in the database by the variable data, for example, artist, title, description, and price.

While the above description contains many specifics, these specifics should not be construed as limitations on the scope of the invention, but merely as exemplifications of the disclosed embodiments. Those skilled in the art will envision many other possible variations that are within the spirit and scope of the invention as described above and defined in the following claims.

What is claimed is:

1. A method of extracting data comprising:
   using a computer processor to perform steps comprising:
      identifying a plurality of templates each comprising at least one information field;
      selecting a close matching one of the plurality of templates, the selecting being at least partially based on an edit distance between a source article and the selected template, wherein the edit distance is a number proportional to a number of insertions and deletions for transforming a template into the source article;
      associating data from the source article with an information field from the close matching template selected based at least partially on the edit distance computed for the selected template and the source article; and
      extracting the associated data.

2. The method of claim 1, wherein the edit distance between the source article and the selected template is computed by a dynamic programming alignment algorithm.

3. The method of claim 1, wherein the information field corresponds to variable data.

4. The method of claim 1, wherein the source article is a web page.

5. The method of claim 4, further comprising simplifying content on the web page.

6. The method of claim 5, wherein simplifying the content comprises preserving at least one selected from the group consisting of: visible text, visible images, visible paragraph formatting, and visible table formatting.

7. The method of claim 1, further comprising displaying the associated data.

8. The method of claim 1, wherein the associated data comprises at least one selected from the group consisting of: product category, product description, product image, price, and SKU number.

9. A computer program product having a tangible computer-readable medium having computer program code executable by a computer processor to perform information extraction, the computer program code comprising code for:
   identifying a plurality of templates each comprising at least one information field;
   selecting a close matching one of the plurality of templates, the selecting being at least partially based on an edit distance between a source article and the selected template, wherein the edit distance is a number proportional to a number of insertions and deletions for transforming a template into the source article;
   associating data from the source article with an information field from the close matching template selected based at least partially on the edit distance computed for the selected template and the source article; and
   extracting the associated data.

10. The computer program product of claim 9, wherein the edit distance between the source article and the selected template is computed by a dynamic programming alignment algorithm.

11. The computer program product of claim 9, wherein the information field corresponds to variable data.

12. The computer program product of claim 9, wherein the source article is a web page.

13. The computer program product of claim 12, further comprising computer program code for simplifying content on the web page.

14. The computer program product of claim 13, wherein simplifying the content comprises preserving at least one selected from the group consisting of: visible text, visible images, visible paragraph formatting, and visible table formatting.

15. A system of extracting data comprising:
    a computer processor;
    an identification engine executable by the computer processor to identify a plurality of templates each comprising at least one information field; and
    an information extractor executable by the computer processor to select a close matching one of the plurality of templates, the selection being at least partially based on an edit distance between a source article and the selected template, wherein the edit distance is a number proportional to a number of insertions and deletions for transforming a template into the source article, associate data from the source article with an information field from the close matching template selected based at least partially on the edit distance computed for the selected template and the source article and extract the associated data.

16. The system of claim 15, wherein the information extractor uses a dynamic programming alignment algorithm to compute an edit distance between the source article and the selected template.

17. The system of claim 15, wherein the information field corresponds to variable data.

18. The system of claim 15, wherein the source article is a web page.

19. The system of claim 18, further comprising:
    a content simplification module executable by the computer processor to simplify content on the web page.

20. The method of claim 19, wherein the content simplification module simplifies content by preserving at least one selected from the group consisting of: visible text, visible images, visible paragraph formatting, and visible table formatting.

* * * * *